United States Patent
Abe et al.

(10) Patent No.: US 7,319,554 B1
(45) Date of Patent: Jan. 15, 2008

(54) DISPLAY MEDIUM, DISPLAY DEVICE AND DISPLAY METHOD

(75) Inventors: Masaaki Abe, Kanagawa (JP); Hiroaki Moriyama, Kanagawa (JP); Yasuo Yamamoto, Kanagawa (JP); Yasufumi Suwabe, Kanagawa (JP); Yoshinori Machida, Kanagawa (JP); Kiyoshi Shigehiro, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/703,148

(22) Filed: Feb. 7, 2007

(30) Foreign Application Priority Data

Aug. 29, 2006 (JP) ............................ 2006-232281

(51) Int. Cl.
*G02B 26/00* (2006.01)
(52) U.S. Cl. ..................... 359/296; 359/290; 430/32; 345/107
(58) Field of Classification Search ............... 359/296, 359/290, 238; 430/32, 34, 38; 345/105, 345/107
See application file for complete search history.

(56) References Cited

FOREIGN PATENT DOCUMENTS

JP          A 2005-128143          5/2005

*Primary Examiner*—Tim Thompson
(74) *Attorney, Agent, or Firm*—Oliff & Berridge, PLC (57) ABSTRACT

The invention provides a display medium including: a pair of substrates facing one another, at least one of the substrates being transparent; electrodes provided at opposing surfaces of the pair of substrates; and a light modulating layer disposed between the pair of substrates, the light modulating layer containing electrophoretic colored particles, a dispersion medium for dispersing the electrophoretic colored particles, and a reflection member having light reflection characteristics different from those of the electrophoretic colored particles, and the surface of the electrophoretic colored particles and the surface of the reflection member satisfying the following formula (1): $180 > |\theta p - \theta r| \geq 20$, in formula (1), $\theta p$ representing a contact angle (degrees) between the surface of the electrophoretic colored particles and water, and $\theta r$ representing a contact angle (degrees) between the surface of the reflection member and water.

17 Claims, 2 Drawing Sheets

DISPLAY MEDIUM, DISPLAY DEVICE AND DISPLAY METHOD

CROSS-REFERENCE TO RELATED APPLICATIONS

This application is based on and claims priority under 35 USC 119 from Japanese Patent Application No. 2006-232281 filed Aug. 29, 2006.

BACKGROUND

1. Technical Field

The present invention relates to a display medium, display method and display device.

2. Related Art

The need for electronic paper systems, color display systems and large area display systems has increased with the emergence of an advanced information-oriented society. Display technologies such as CRT, liquid crystal, EL, LED and plasma displays have been developed in order to meet these needs. In addition, further to these spontaneous light emission systems, development has been attempted of reflection display systems that consume a low level of electric power and are comfortable to the human eye.

A reflection liquid crystal technology is a representative example of a reflection display system, and an electrophoretic display technology is another example.

An electrophoretic display medium usually includes a medium and colored particles (electrophoretic colored particles) that are dispersed in the medium and electrophoresced between two substrates each having an electrode and facing one another with the electrodes at inner sides of the respective substrates, and at least one of the substrates being transparent. An image is displayed by changing the light reflection characteristics of the display surface by electrically moving the colored particles.

SUMMARY

According to an aspect of the invention, there is provided a display medium including:

a pair of substrates facing one another, at least one of the substrates being transparent;

electrodes provided at opposing surfaces of the pair of substrates; and a light modulating layer disposed between the pair of substrates, the light modulating layer containing electrophoretic colored particles, a dispersion medium for dispersing the electrophoretic colored particles, and a reflection member having light reflection characteristics different from those of the electrophoretic colored particles, and the surface of the electrophoretic colored particles and the surface of the reflection member satisfying the following formula (1):

$$180 > |\theta p - \theta r| \geq 20 \quad \text{formula (1)}$$

in formula (1), θp representing a contact angle (degrees) between the surface of the electrophoretic colored particles and water, and θr representing a contact angle (degrees) between the surface of the reflection member and water.

BRIEF DESCRIPTION OF THE DRAWINGS

Exemplary embodiments of the present invention will be described in detail based on the following figures, wherein.

DETAILED DESCRIPTION

-Display Method-

The display method of the invention is a display method including:

applying an electric field to a light modulating layer containing electrophoretic colored particles, a dispersion medium for dispersing the electrophoretic colored particles, and a reflection member having light reflection characteristics different from those of the electrophoretic colored particles; and changing the display by moving the electrophoretic colored particles so as to collide with a surface of the reflection member, the surface of the electrophoretic colored particles and the surface of the reflection member satisfying the following formula (1):

$$180 > |\theta p - \theta r| \geq 20 \quad \text{formula (1)}$$

in formula (1), θp representing a contact angle (degrees) between the surface of the electrophoretic colored particles and water, and θr representing a contact angle (degrees) between the surface of the reflection member and water.

The direction of the electric field gradient relative to the light modulating layer and the position of the reflection member disposed in the light modulating layer are not particularly restricted in the display method of the invention, provided that the display of the image is changed by applying an electric field so that electrophoretic colored particles moving in the electric field gradient direction in the light modulating layer collide with the surface of the reflection member. However, the reflection member is usually disposed in the light modulating layer so as to be spread in the plane direction of the light modulating layer. While an electric field may be applied so as to form an electric field gradient in the plane direction of the light modulating layer, an electric field may be applied so as to form an electric field gradient in the thickness direction of the light modulating layer. The electrophoretic colored particles moving in the plane direction of the light modulating layer by applying an electric field collide with the reflection member when the electric field gradient is formed in the plane direction of the light modulating layer, while the electrophoretic colored particles moving in the thickness direction of the light modulating layer by applying an electric field collide with the reflection member when the electric field gradient is formed in the thickness direction of the light modulating layer.

Macroscopically, the electrophoretic colored particles move back and forth in the direction of the electric field gradient in the light modulating layer when the image is repeatedly displayed. The electrophoretic colored particles collide with the surface of the reflection member disposed in the light modulating layer many times during the reciprocating movements. The proportion of the electrophoretic colored particles that remain adhered after collision on the surface of the reflection member gradually increases by repeated display when the difference of the surface energy between the surface of the electrophoretic colored particles and the surface of the reflection member is small and affinity between both surfaces is large, so that the number of the electrophoretic colored particles movable in the light modulating layer decreases. This phenomenon results in decrease in contrast with time.

However, in the invention, since the difference of the contact angle between the surface of the electrophoretic colored particles and the surface of the reflection member is large as shown by formula (1), the electrophoretic colored particles hardly adhere on the surface of the reflection member even after repeated collision of the particles with the surface of the reflection member. Accordingly, decrease in contrast with time can be suppressed even after repeated display according to the display method of the invention, when the image is displayed by utilizing electrophoretic colored particles and a member (reflection member) having different optical characteristics from those of the electrophoretic colored particles.

As shown in formula (1), $|\theta p - \theta r|$ (which may be abbreviated as $\Delta\theta$ hereinafter) is 20 degrees or more, and may be specifically 30 degrees or more, and more specifically 45 degrees or more. The contrast decreases with time when $\Delta\theta$ is less than 20 degrees since the proportion of the electrophoretic colored particles that remain adhered after colliding with the surface of the reflection member gradually increases by repeated display while the number of the electrophoretic colored particles movable in the light modulating layer decreases. While $\Delta\theta$ may be large in terms of suppressing decrease in contrast with time, $\Delta\theta$ may be practically less than 180 degrees, particularly less than 120 degrees, in order not to limit selection ranges of materials constituting the electrophoretic colored particles and reflection member.

While the contact angle $\theta p$ between the surface of the electrophoretic colored particles and water, the contact angle $\theta r$ between the surface of the reflection member and water, and the magnitude correlation between the contact angle $\theta p$ and contact angle $\theta r$ are not particularly restricted in the invention so long as they satisfy formula (1), the contact angle $\theta p$ may be larger than the contact angle $\theta r$.

This is because a hydrophobic solvent rather than a hydrophilic solvent may be used as a dispersion medium in the invention from the viewpoint that such a solvent is hardly decomposed by electric current and has high insulating property, a high voltage can be applied thereto, and consumption of the electric power is small, and in such a case, dispersibility of the electrophoretic colored particles in a hydrophobic solvent as a dispersion medium can be readily ensured.

The contact angles $\theta p$ and $\theta r$ are measured using a contact angle meter (trade name: CA-X, manufactured by Kyowa Interface Science Co., Ltd.). Water used for measuring the contact angles is ion-exchange water. Fine particles that are difficult to measure are molded into a sample by compressing at a pressure of 400 kgf/cm$^2$ for 2 minutes using a pressurizing pump (trade name: P-16B, manufactured by RIKENKIKI CO., LTD).

-Display Medium-

The display medium with which the display method of the invention is carried out is not particularly restricted so long as the medium can be applied for the display method of the invention, but may be a display medium including a pair of substrates facing one another, at least one of which is transparent, electrodes provided at opposing surfaces of the pair of substrates, and a light modulating layer disposed between the pair of substrates, wherein the light modulating layer contains at least one kind of electrophoretic colored particles, a dispersion medium for dispersing the electrophoretic colored particles, and a reflection member having different light reflection characteristics from those of the electrophoretic colored particles. The invention will be described hereinafter on the assumption that the display medium having the above-mentioned configuration is used.

While only one light modulating layer may be provided in the display medium, plural independent light modulating layers which are separated from each other by partition walls may be provided. In this case, a variety of displays are possible by independently controlling the voltage applied to each light modulating layer, or by changing the kind of the dispersion liquid for each light modulating layer (dispersion liquid of electrophoretic colored particles) which is obtainable by dispersing electrophoretic colored particles in a dispersion medium.

Full color display is possible by using three kinds of dispersion liquids, such as an electrophoretic colored particles dispersion liquid that is red colored when the electrophoretic colored particles are dispersed in a dispersion liquid, an electrophoretic colored particles dispersion liquid that is green colored when the electrophoretic colored particles are dispersed in a dispersion liquid and an electrophoretic colored particles dispersion liquid that is blue colored when the electrophoretic colored particles are dispersed in a dispersion liquid. While respective light modulating layers corresponding to R, G and B may be disposed in the plane direction of the display medium using the R, G and B light modulating layers as one set, the light modulating layers may be laminated in the thickness direction of the display medium, or both arrangements may be used in combination. In the latter case, since each substrate and light modulating cell are sequentially laminated, substrates other than one substrate of the substrates constituting both surfaces of the display medium should be transparent.

When only one light modulating layer is provided in the display medium of the invention, the display medium can be used for a surface light source such as a back light of a liquid crystal panel or a monochromatic plane panel since switching is possible between monochromatic display of one color and another color (and further an intermediate color) on the entire surface of the display medium.

The configuration of each part constituting the display medium of the invention and constituent materials will be described in detail hereinafter.

-Light Modulating Layer-

The light modulating layer contains at least one kind of electrophoretic colored particles, a dispersion medium for dispersing the electrophoretic colored particles, and a reflection member having different light reflection characteristics from those of the electrophoretic colored particles. Various additives may be optionally added in the dispersion medium.

-Electrophoretic Colored Particles-

The electrophoretic colored particles used in the invention are either positively or negatively charged so as to be able to move in the direction of the electric field gradient in the dispersion medium when an electric field is applied, and form a color when dispersed in the dispersion medium.

The phrase "form a color when dispersed" means that a hue can be visually observed from the dispersion liquid when the electrophoretic colored particles are dispersed in the dispersion medium. The hue is visually observed in the range of thickness of the dispersion liquid from about 10 μm to about 1 cm in the direction of the visual observation. The hue may be changed in various colors by changing the shape and particle diameter of the electrophoretic colored particles or the materials constituting the electrophoretic colored particles.

Examples of the electrophoretic colored particles include colorants such as organic pigments, inorganic pigments, colored glass, dyes and resins, resin particles containing these colorants and metal colloid particles. These particles may be optionally subjected to surface treatment with silane coupling agents.

Known organic pigments, inorganic pigments and dyes may be used as the colorant. Examples of the organic pigments include azo dyes, polycondensed azo dyes, metal complex azo dyes, flavanthrone pigments, benzimidazolone pigments, phthalocyanine pigments, quinacridone pigments, anthraquinone pigments, anthrapyridine pigments, pyranthrone pigments, dioxadine pigments, perylene pigments, perynone pigments, isoindolinone pigments, quinophthalone pigments, thioindigo pigments and indanthrene pigments. Examples of the inorganic pigments include zinc white, titanium oxide, zinc oxide, zirconium oxide, antimony white, carbon black, iron black, titanium borate, iron oxide red, mapico yellow, red lead, cadmium yellow, zinc sulfide, lithopone, barium sulfide, cadmium selenide, barium sulfate, lead chromate, lead sulfate, barium carbonate, calcium carbonate, lead white and alumina white; and examples of the dyes include nigrosine dyes, phthalocyanine dyes, azo dyes, anthraquinone dyes, quinophthalone dyes and methine dyes.

The resin particles containing a colorant may be manufactured, for example, by a known dry process of kneading and pulverizing a solid resin in which a colorant is dispersed, or by a known wet process of obtaining resin particles by granulation in a dispersion liquid in which materials such as colorants and resins are dispersed.

As the electrophoretic colored particles, metal colloid particles may be used, which may be metal colloid particles containing a precious metal.

The hue originating from the metal colloid particles may be caused by particles' own light shielding property (i.e. black), or by particles' own color forming property. In the latter case, the metal colloid particles may have a color strength due to surface plasmon resonance.

Color due to surface plasmon resonance of metal colloid particles is ascribed to plasma vibration of electrons, that is, the color is formed by the color forming mechanism called plasmon absorption. It is thought that when color is formed by plasmon absorption, free electrons in the metal vibrate due to an optical electric field, whereby electric charges appear on the surface of the particles and cause non-linear polarization. The color formed by the metal colloid particles exhibits high color saturation and high transmittance of light, and is excellent in durability. The color formed by the metal colloid particles is observed in what is called nanoparticles having a particle diameter from several nanometers to scores of nanometers. It is advantageous to use metal colloid particles having a narrow particle diameter distribution in terms of bright hue. Accordingly, the average particle diameter (volume average particle diameter) of the metal colloid particles may be in the range from 1 to 100 nm, specifically from 5 to 50 nm.

The metal colloid particles can form various colors depending on the kind of the metals contained in the particles, the shape of the particles and volume average particle diameter. Accordingly, various hues including R, G and B may be obtained by using metal colloid particles in which the above-mentioned factors are regulated. While color display is possible by a display medium using a dispersion liquid in which metal colloid particles having a color strength due to surface plasmon resonance are dispersed in the dispersion medium, a display medium of an RGB system may be manufactured using a dispersion liquid of metal colloid particles corresponding to R, G and B.

While the volume average particle diameter of the metal colloid particles for forming respective colors of R, G and B by RGB system cannot be particularly restricted since the color formed depends on the metal used, preparation conditions of the particles and the shape of the particles, for example, gold colloid particles tend to form, R, G and B colors in this order as the volume average particle diameter is increased.

A laser diffraction-scattering method is used for measuring the volume average particle diameter in the invention, wherein a laser light is irradiated to a group of particles, and the average particle diameter is measured from the intensity distribution pattern of the diffracted or scattered light emitted from the particles. The particle diameter can be measured, for example, using a micro-track particle diameter distribution measuring apparatus (trade name: MT 3300, manufactured by Nikkiso Co., Ltd.).

Examples of the metal contained in the metal colloid particles include known precious metals such as gold, silver, ruthenium, rhodium, palladium, osmium, iridium and platinum, and may be gold and/or silver. Metals other than precious metals (for example copper) are also available, and the metal colloid particles may contain plural kinds of metals.

The electrophoretic colored particles may be subjected to surface treatment (hydrophilizing treatment or hydrophobilizing treatment) in the invention so as to satisfy formula (1).

While examples of the surface treatment method include a chemical treatment method using a surface treatment agent such as a silane coupling agent, and a physical treatment method of modifying the surface by applying some physical stimulation on the surface of the electrophoretic colored particles, the chemical treatment method may be used in the invention.

While the surface treatment agent can be selected by taking affinity to the material of the particle body of the electrophoretic colored particles into consideration, silane compounds, silicone compounds and fatty acids may be used for the hydrophobilizing treatment, and alcohols, hydrophilic resins and inorganic oxides may be used for the hydrophilizing treatment.

Examples of the silane compound used for the hydrophobilizing treatment include a known silane coupling agent having a molecular structure including a reactive part to react with the body of the electrophoretic colored particles and a hydrophobic part.

Specific examples include octadecyl trimethoxysilane, phenethyl trimethoxysilane, aminopropyl triethoxysilane, 3-aminopropyl trimethoxysilane, metacryloxy trimethoxysilane, methoxy trimethylsilane, 3-aminopropyl diethoxymethylsilane, N-(2-aminoethyl)-3-aminopropyl trimethoxysilane, N-(2-aminoethyl)-3-aminopropyl methyldimethoxysilane.

Examples of the silicone compound used for the hydrophobilizing treatment include methyl polysiloxane, octamethyl cyclotetrasiloxane, decamethyl cyclopentane siloxane, methyl cyclopolysiloxane and methyl hydrogen polysiloxane.

Examples of the fatty acid used for the hydrophobilizing treatment include lauric acid, myristic acid, stearic acid, oleic acid, linoleic acid, linolenic acid, hydroxy fatty acid, capronic acid, caprylic acid, palmitic acid, behenic acid, palmitoleic acid, erucic acid, alkali metal salts of these fatty acids such as sodium salts and potassium salts, alkali earth metal salts of these fatty acids such as magnesium salts and calcium salts, and esters of these fatty acids.

Examples of the alcohol used for the hydrophilizing treatment include methyl alcohol, ethyl alcohol, propanol, isopropanol, butyl alcohol, glycerin, propyleneglycol and 1,3-butyleneglycol.

Examples of the hydrophilic resin used for the hydrophilizing treatment include polyacrylic acid, polyvinyl alcohol, polyvinyl pyrrolidone, polyamide and polyimide.

Examples of the inorganic oxide used for the hydrophilizing treatment include silica, alumina and titania.

-Reflection Member-

The reflection member used in the invention has different light reflection characteristics from those of the electrophoretic colored particles.

"Having different light reflection characteristics from those of the electrophoretic colored particles" as used herein means that, when a dispersion liquid in which only the electrophoretic colored particles are dispersed and the reflection member are compared by visual observation, the hue, brightness or vividness are different to an extent capable of distinguishing the difference between the dispersion liquid and reflection member.

The reflection member may be disposed in the light modulating layer so as to be distributed in the entire plane direction of the light modulating layer. Viewing angle dependency may be reduced by disposing the reflection member in the thickness direction of the light modulating layer so as to be positioned at the side where the observer visually recognizes the color and image displayed on the display medium.

While the shape of the reflection member is not particularly restricted so long as the reflection member is disposed in the light modulating layer, the member may be particles or films.

When the reflection member is a film, the film reflection member may be disposed so as to intersect the direction of the electric field gradient formed when an electric field is applied to the light modulating layer and so as to partition the light modulating layer into two parts. In this case, the film reflection member should have pores that penetrate the film in the thickness direction of the film and have a diameter larger than the size of the electrophoretic colored particles.

When the shape of reflection member is particulate, on the other hand, plural particulate reflection members may be disposed in the light modulating layer so as to ensure spaces with a size that permits the electrophoretic colored particles to pass through gaps between the particulate reflection members.

When the shape of the reflection member is particulate, a high contrast may be readily obtained. This is because when the reflection member is particles, color density ascribed to the reflection member itself (for example, whiteness when the color of the reflection member is white) can be readily enhanced by increasing the packing fraction of the particulate reflection member in the light modulating layer. On the contrary, it is principally difficult for the film reflection member to enhance the color density since pores for allowing particles to pass through should be provided in the film. Accordingly, a high initial contrast may be readily obtained by the particulate reflection member than by the film reflection member.

The film reflection member may be disposed in the light modulating layer so that the plane thereof is perpendicular to the direction of the electric field gradient as shown in JP-A No. 2005-128143 in order to simplify the structure of the display medium and in order to facilitate production of the display medium. However, since the plane portion of the film on which no pores for allowing the electrophoretic colored particles to pass through are formed is perpendicular to the direction of the electric field gradient, the electrophoretic colored particles may tend to physically deposit on the plane portion even when the electrophoretic colored particles satisfy formula (1) and hardly adhere on the plane portion.

When particulate reflection member are used, on the other hand, there is no possibility of causing decrease in contrast due to physical deposition of the electrophoretic colored particles on the surface of the particulate reflection member since the proportion of the area of the portion perpendicular to the direction of the electric field gradient in the total surface area of the reflection member is small as compared with the case using the film reflection member.

Whether $\Delta\theta$ between the inner wall of the pore of the film reflection member and the surface of the electrophoretic colored particles satisfies formula (1) or not, the electrophoretic colored particles passing through the pores of the film reflection member are considered to have higher probability of passing through the pore without colliding with the inner wall of the pore or higher probability of colliding with the inner surface of the pore with a smaller angle rather than with a larger angle during repeated display since the axial direction of the pore is the same as the direction of the electric field gradient.

That is, since the pore size is sufficiently larger than the diameter of the electrophoretic colored particles, or the electrophoretic colored particles collide with the inner surface of the pore with a smeller angle, the kinetic energy of the electrophoretic colored particles can readily overcome the force for allowing the electrophoretic colored particles to adhere on the reflection member by an intermolecular force between the electrophoretic colored particles and the inner wall of the pore.

Thus, since the electrophoretic colored particles hardly adhere on the inner wall of the pore in nature, the improving effect obtained by applying the invention is not expected to be so large.

On the other hand, since the electrophoretic colored particles collided with the surface of the particulate reflection member with a wide range of angles during repeated display when the reflection member is particulate, the kinetic energy of the electrophoretic colored particles can hardly overcome the force that permit the electrophoretic colored particles to adhere by an intermolecular force between the electrophoretic colored particles and the particulate reflection member as compared with the case using the film reflection member.

Accordingly, adhesion of the electrophoretic colored particles on the surface of the particulate reflection member is accumulated when $\Delta\theta$ is small to evidently cause decrease in contrast over time. However, the invention is quite advantageous when the particulate reflection member is used, since a large improvement effect is obtained.

The thickness of the film reflection member used in the invention may be in the range from 5 to 500 μm, while the diameter of the pore of the film reflection member may be in the range from 2 to 1000 times the average particle diameter of the electrophoretic colored particles.

While the particle diameter of the particulate reflection member (the particle diameter refers to a volume average particle diameter when the particle of the reflection member has no regular form) is not particularly restricted so long as the diameter is in the same order as or smaller than the thickness of the light modulating layer, the diameter may be usually in the range from 1 to 100 μm. However, when the particle is required to have a function of maintaining the thickness of the light modulating layer provided between the pair of substrates always constant, the particle diameter of the particles of the reflection member may be the same order as the thickness of the light modulating layer. On the other hand, the diameter of the particulate reflection member may be in the range from $1/100$ to $1/2$ of the thickness of the light modulating layer, when the volume packing fraction of the particulate reflection member in the light modulating layer is enhanced or when irregular contrast caused by the gap between the particles of the light reflection member in the plane of the display medium is suppressed by filling the gap between the particulate reflection member in one layer with another particulate reflection member in another layer by laminating plural layers of the particulate reflection member in the thickness direction of the light modulating layer.

The volume average particle diameter (X) of the particulate reflection member may be larger than the volume average particle diameter (Y) of the electrophoretic colored particles, and the ratio (X/Y) may be in the range from 2 to 50,000, particularly from 20 to 10,000. The electrophoretic colored particles readily move through the gap between the particulate reflection member when the particulate reflection member is larger than the electrophoretic colored particles, and responsiveness of color display by the electrophoretic colored particles may be thus improved.

The volume packing fraction of the particulate reflection member may be from 20% by volume to 70% by volume, particularly from 30% by volume to 60% by volume, for obtaining high initial contrast. High initial contrast may not be obtained as compared with the case using the film reflection member when the volume packing fraction is less than 20% by volume. On the other hand, high initial contrast may not be also obtained when the volume packing fraction exceeds 70% by volume since the proportion of the electrophoretic colored particles in the light modulating layer decreases relative to the particulate reflection member.

While the color of the reflection member is not particularly restricted, it may be colored or white. White display with high whiteness is possible by allowing the electrophoretic colored particles dispersed in the dispersion medium in the light modulating layer to move to one of the electrodes by applying an electric field when the reflection member is white.

Known materials may be used as the material constituting the reflection member, provided that the material is not dissolved or degraded by the dispersion medium. Examples of organic material of the reflection member include melamine resin, acrylic resin, polyester resin and polyether sulfone resin, and examples of the inorganic material include titanium oxide, silica and magnesium oxide. Organic materials in which pores can be easily made may be used for the film reflection member.

The surface of the reflection member may be subjected to surface treatment (hydrophilizing treatment or hydrophobilizing treatment) so as to satisfy formula (1) in accordance with the electrophoretic colored particles used. When the surface of the electrophoretic colored particles is hydrophilic or subjected to hydrophilizing treatment, the surface of the reflection member may be subjected to hydrophobizing treatment, while the surface of the reflection member may be subjected to hydrophilizing treatment when he surface of the electrophoretic colored particles is hydrophobic or subjected to hydrophobilizing treatment.

While examples of the surface treatment methods include a chemical treatment using a surface treatment agent such as a silane coupling agent and a physical treatment method for modifying the surface by applying some physical stimulation to the surface of the electrophoretic colored particles, the chemical treatment method may be used in the invention.

While the surface treatment agent may be selected by taking affinity to the material constituting the body of the reflection member into consideration, examples of the surface treatment agent include silane compounds, silicone compounds and fatty acids for hydrophobilizing treatment, and alcohols, hydrophilic resins and inorganic oxides for hydrophilizing treatment.

Examples of the silane compound used for the hydrophobilizing treatment include a known silane coupling agent having a molecular structure including a reactive part to react with the body of the electrophoretic colored particles and a hydrophobic part.

Specific examples include octadecyl trimethoxysilane, phenethyl trimethoxysilane, aminopropyl triethoxysilane, 3-aminopropyl trimethoxysilane, metacryloxy trimethoxysilane, methoxy trimethylsilane, 3-aminoprypyl diethoxymethylsilane, N-(2-aminoethyl)-3-aminopropyl trimethoxysilane, N-(2-aminoethyl)-3-aminopropyl methyldimethoxysilane.

Examples of the silicone compound used for the hydrophobilizing treatment include methyl polysiloxane, octamethyl cyclotetrasiloxane, decamethyl cyclopentane siloxane, methyl cyclopolysiloxane and methyl hydrogen polysiloxane.

Examples of the fatty acid used for the hydrophobilizing treatment include lauric acid, myristic acid, stearic acid, oleic acid, linoleic acid, linolenic acid, hydroxy fatty acid, capronic acid, caprylic acid, palmitic acid, behenic acid, palmitoleic acid, erucic acid, alkali metal salts of these fatty acids such as sodium salts and potassium salts, alkali earth metal salts of these fatty acids such as magnesium salts and calcium salts, and esters of these fatty acids.

Examples of the alcohol used for the hydrophilizing treatment include methyl alcohol, ethyl alcohol, propanol, isopropanol, butyl alcohol, glycerin, propyleneglycol and 1,3-butyleneglycol.

Examples of the hydrophilic resin used for the hydrophilizing treatment include polyacrylic acid, polyvinyl alcohol, polyvinyl pyrrolidone, polyamide and polyimide.

Examples of the inorganic oxide used for the hydrophilizing treatment include silica, alumina and titania.

-Dispersion Medium-

The dispersion medium contains at least an insulating liquid, and the volume resistivity thereof may be $10^3$ Ω·cm or more, particularly from $10^7$ Ω·cm to $10^{19}$ Ω·cm, and more particularly from $10^{10}$ Ω·cm to $10^{19}$ Ω·cm. Due to the volume resistivity in this range, air bubbles generated by electrolysis of the dispersion medium and ascribed to the electrode reaction are more effectively suppressed, electrophoretic characteristics of the electrophoretic colored particles are not impaired at every time of flowing electric current, and the electrophoretic colored particles become stable against repeated display. An acid, an alkali, a salt, a dispersion stabilizing agent, a stabilizing agent for preventing oxidation or UV absorption, an antibacterial agent and antiseptic agent may be added to the dispersion medium in addition to the insulating liquid. In this case, the volume resistivity may fall within the above-mentioned range.

Known water-soluble organic solvents and hydrophobic organic solvents may be used as the insulating liquid added to the dispersion medium. Examples of the solvents include hexane, cyclohexane, toluene, xylene, decane, hexadecane, kerosene, paraffin, isoparaffin, silicone oil, dichloroethylene, trichloroethylene, perchloroethylene, high purity petroleum, ethyleneglycol, alcohols, ethers, esters, dimethylformamide, dimethylacetamide, dimethylsulfoxide, N-methyl pyrrolidone, 2-pyrrolidone, N-methyl formamide, acetonitrile, tetrahydrofuran, propylene carbonate, ethylene carbonate, benzine, diisopropyl naphthalene, olive oil, isopropanol, trichlorotrifluoro ethane, tetrachloroethane and dibromotetrafluoro ethane, and mixtures thereof.

Water (what is called pure water) may be used after removing impurities so that the volume resistivity falls within the above-mentioned range.

Of the insulting liquids listed above, hydrophobic solvents that are hardly decomposed by applying a voltage such as hexane, cyclohexane, kerosene, paraffin and silicone oil may be used, and particularly silicone oil may be used.

This is because silicone oil is characterized in that (1) the dispersion medium is hardly decomposed by applying higher voltage, (2) vigorous convention currents hardly occur due to high viscosity when precious metal particles are electrophoresed, and thus decrease in contrast and disturbance in display ascribed to vigorous convention current hardly occur, and (3) the dispersion medium is hardly evaporated when a dispersion liquid in which colored particles are dispersed is filled into a space that serves as a light modulating layer of the display medium under a reduced pressure for manufacturing the display medium, as compared with dispersion medium such as hexane, cyclohexane, kerosene or paraffin used for a display medium of conventional electrophoretic methods.

Known silicone oils may be used without any restriction. The silicone oil may have (1) a resistivity of $10^3$ Ω·cm or more, particularly from $10^7$ Ω·cm to $10^{19}$ Ω·cm, and more particularly from $10^{10}$ to $10^{19}$ Ω·cm, and (2) a viscosity from 1 to 1000 cst, particularly from 1 to 100 cst. Specific examples of the silicone oil include dimethyl silicone oils such as KF-96 (trade name: manufactured by Shin-Etsu Chemical Co., Ltd.), DOW CORNING 200 (trade name: manufactured by Dow Corning Co.), and TSF 451 (trade name: manufactured by GE Toshiba Silicone Co.). Another example of the silicone oil available is a modified silicone oil having organic groups at a part of methyl groups of dimethyl polysiloxane (for example, trade name: KF-393 and X22-3710, manufactured by Shin-Etsu Chemical Co., Ltd.).

The contact angle may be 20 degrees or less, particularly 5 degrees or less, and more particularly 0 degree between the dispersion medium and the surface of the electrophoretic colored particles. Dispersibility of the electrophoretic colored particles in the dispersion medium may be decreased to cause aggregation of the electrophoretic colored particles when the contact angle between the dispersion medium and the surface of the electrophoretic colored particles exceeds 20 degrees. The contact angle between the dispersion medium and the surface of the electrophoretic colored particles is measured by using the dispersion medium in place of water for measuring θp.

-Substrate-

Examples of the substrate that may be used for the display medium of the invention include films or film substrate of polymers such as polyesters (for example polyethylene terephthalate), polyimide, methyl polymethacrylate, polystyrene, polypropylene, polyethylene, polyamide, nylon, polyvinyl chloride, polyvinylidene chloride, polycarbonate, polyether sulfone, silicone resin, polyacetal resin, fluorinated resin, cellulose derivatives and polyolefin, and inorganic substrates such as glass substrate, metal substrate and ceramic substrate.

At least one of the pair of substrates used for the display medium is a transparent substrate that transmits visible light. Both substrates are transparent substrates when a transmissive display medium is manufactured. The transparent substrate may have a visible light transmittance of 50% or more, particularly 100%.

A wiring line, thin film transistor, metal layer, diode having a metal/insulation layer/metal structure, variable capacitor and driving switching element such as ferroelectrics may be optionally formed on the substrate.

-Electrode-

A layer of a metal oxide such as tin oxide-indium oxide (ITO), tin oxide or zinc oxide may be used as the electrode formed on the surface of the substrate at the light modulating layer side. A transparent electrode having a visible light transmittance of 50% or more may be used. A metal oxide layer such as tin oxide-indium oxide (ITO), tin oxide or zinc oxide layer as well as a conductive polymer, carbon or a metal layer such as copper, aluminum, gold, silver, nickel or platinum layer may be used as a material for the electrode positioned at the far side from the observer in the case of a reflection optical element. One of the above-mentioned materials may be used alone as the electrode, or plural materials may be laminated.

-Other Members-

In the display medium of the invention, a partition wall may be provided between a pair of substrates, in order to prevent components of the light modulating layer such as a dispersion medium from leaking out of the display medium, or in order to partition light modulating layers provided adjacent to one another in the plane direction of the display medium when the display medium includes plural independent light modulating layers.

The height of the partition wall is not particularly restricted, and is usually from about 20 μm to about 1 mm. While the width of the partition wall is not particularly restricted, smaller width is usually advantageous in terms of resolution of the display medium, and the width is usually from about 10 μm to about 1 mm.

The material of the partition wall is not particularly restricted so long as it is insulative and does not dissolve in the dispersion medium, and known photosensitive resins and rubbers may be sued.

An adhesive may be used for bonding the partition wall to the substrate for manufacturing the display medium. The adhesive is not particularly restricted, and thermosetting resins and UV curable resins are available. A material may be selected which does not affect the partition wall material and material constituting the light modulating layer.

-Display Device-

The display device using the above-mentioned display medium of the invention will be described below. The display device of the invention includes the display medium of the invention as well as an electric field application unit connected to the electrodes of the display medium. This configuration permits the display device to display an image without being connected to an external electric field application unit. The electric field application unit may be optionally an AC power source or DC power source, and both power sources may be used together when an AC voltage and a DC voltage are simultaneously applied through the electrodes to the light modulating layer.

-Specific Examples of Display Medium (Display Device)-

Specific examples of the display medium of the invention will be described with reference to drawings. The same reference numeral is given to the members having the same function, and descriptions thereof are omitted.

Figure 1A:
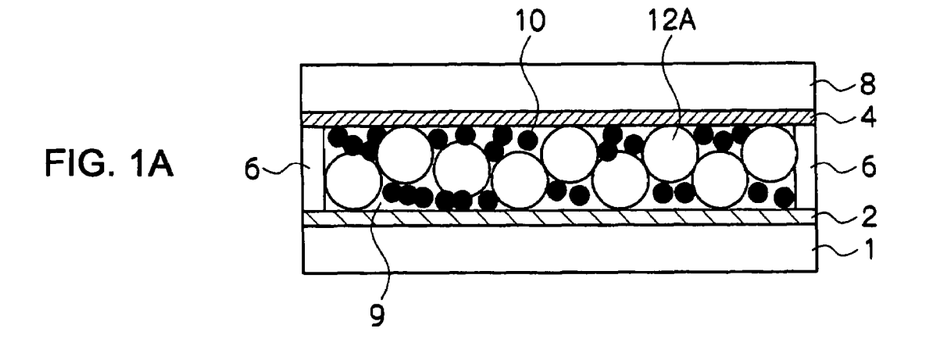
FIGS. 1A to 1C are schematic cross sections showing an example of the display medium of the invention.
Figure 1B:
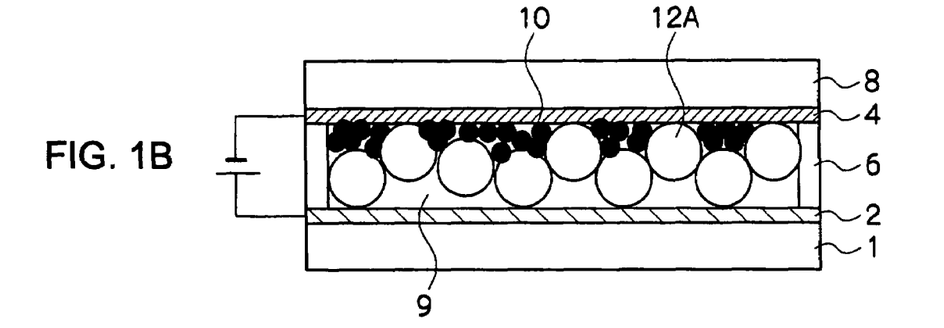
Figure 1C:
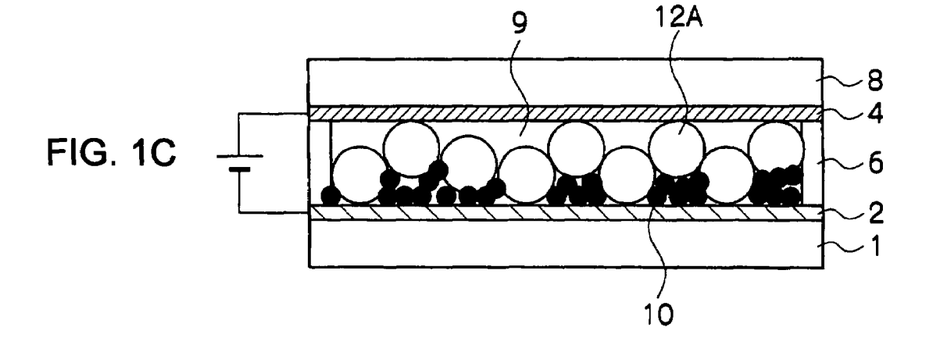

FIGS. 1A to 1C are schematic cross sections showing an embodiment of the display medium of the invention. FIG. 1A shows a state in which no voltage is applied to the display medium, FIG. 1B shows a state in which a voltage is applied to the display medium, and FIG. 1C shows a state in which the reverse voltage of the voltage in FIG. 1B is applied to the display medium.

The display medium shown in FIGS. 1A to 1C shows one unit cell having a first substrate 1 and a second substrate 8 facing one another, a first electrode 2 formed so as to cover the entire surface of the first substrate 1 at the side facing the second substrate 8, a second electrode 4 formed so as to cover the entire surface of the second substrate 8 at the side facing the first substrate 1, and a partition wall 6 provided so as to seal the periphery of the cell having the first substrate 1 and second substrate 8, wherein an electrophoretic colored particle dispersion liquid containing electrophoretic colored particles 10 and a dispersion medium are included in a space (which corresponds to a light modulating layer) sealed with the first substrate 1, second substrate 8 and partition wall 6, together with particulate reflection members 12A. While only one unit cell of the display medium is shown in FIGS. 1A to 1C, plural cells may be continuously disposed in the plain direction of the substrate in one dimension or two dimensions with partition walls between adjoining cells.

While above-mentioned materials may be used for the particulate reflection members 12A, white titanium oxide particles with a particle diameter of approximately 10 μm may be used for improving the contrast. In this case, as shown in FIGS. 1A to 1C, the particulate reflection members 12A are disposed in the light modulating layer so that no gaps are formed between the adjoining particulate reflection members 12A in the plane direction of the light modulating layer.

The display medium shown in FIGS. 1A to 1C may be manufactured as follows. First, the first electrode 2 is formed on the entire surface at one side of the first substrate 1 and the second electrode 4 is formed on the entire surface at one side of the second substrate 8. Then, the partition wall 6 is laminated at the periphery of the surface of the first substrate 1 on which the first electrode 2 is formed (partition wall forming step). Subsequently, the partition wall 6 and the surface of the second substrate 8 on which the second electrode 4 is formed are bonded with an adhesive (bonding step).

The electrophoretic colored particle dispersion liquid is sealed in a light modulating layer portion as follows. An injection port for the electrophoretic colored particle dispersion liquid is formed simultaneously in the partition wall forming step by not forming a part of the partition wall 6 so that the electrophoretic colored particle dispersion liquid can be injected into the light modulating layer portion under a reduced pressure afterward. Then, the electrophoretic colored particle dispersion liquid is sealed into the light modulating layer portion by injection under a reduced pressure after the bonding step by utilizing the injection port. The display medium is obtained by sealing the injection port thereafter.

The action of the display medium of the invention shown in FIGS. 1A to 1C will be described below.

In the description of the action, it is assumed that the second substrate 8 and second electrode 4 are transparent to visible light, the electrophoretic colored particles 10 are positively charged red particles, the particulate reflection members 12A are white, and the color displayed by the display medium is observed from the side where the second substrate 8 of the display medium is provided.

When no voltage is applied, a red color is observed since the electrophoretic colored particles 10 are dispersed in the light modulating layer as shown in FIG. 1A. When a positive voltage is applied to the first electrode 2 and a negative voltage is applied to the second electrode 4 as shown in FIG. 1B, the electrophoretic colored particles 10 move to the negative electrode (second electrode 4) side, and the display medium displays a deep red color.

On the other hand, when a negative voltage is applied to the first electrode 2 and a positive voltage is applied to the second electrode 4 as shown in FIG. 1C, the electrophoretic colored particles 10 move to the negative electrode (first electrode 2) side, and the display medium displays a white color (the color of the particulate reflection members 12A).

Figure 2A:
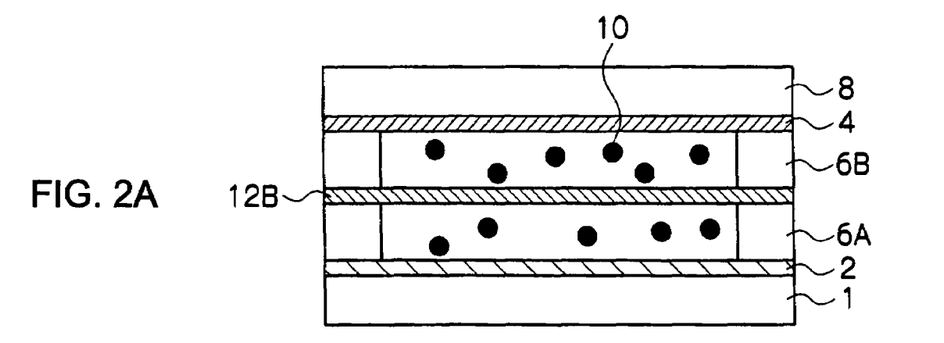
FIGS. 2A to 2C are schematic cross sections showing another example of the display medium of the invention.
Figure 2B:
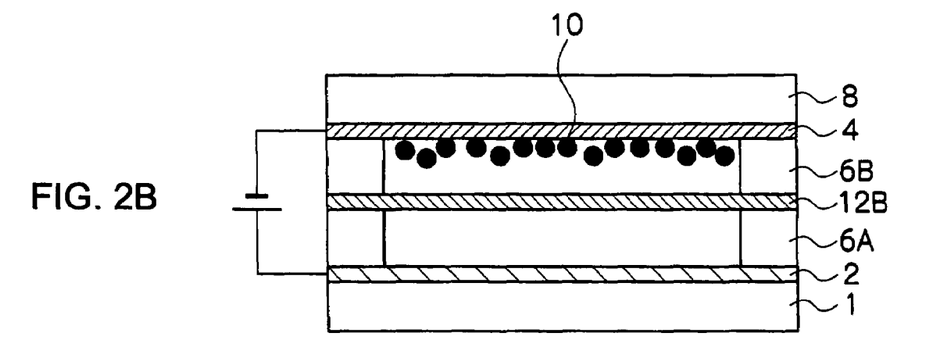
Figure 2C:
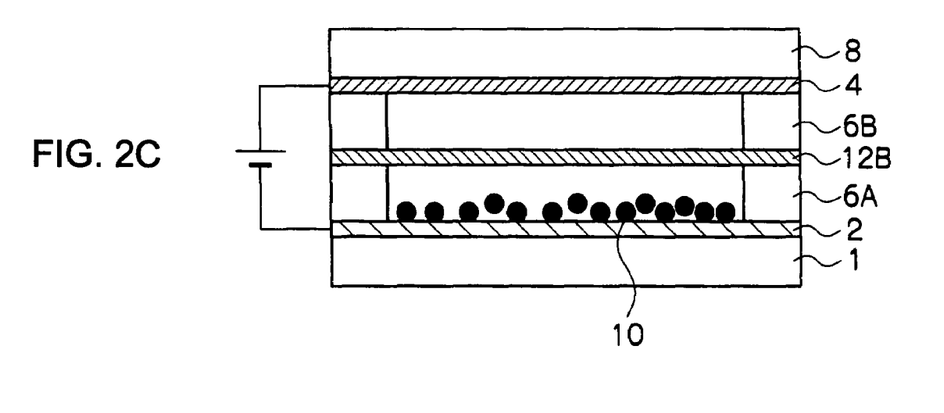

FIGS. 2A to 2C are schematic cross sections showing an example of the display medium of the invention. FIG. 2A shows a state in which no voltage is applied to the display medium, FIG. 2B shows a state in which a voltage is applied to the display medium, and FIG. 2C shows a state in which the reverse voltage of the voltage applied in FIG. 2B is applied to the display medium.

The display medium shown in FIGS. 2A to 2C shows one unit cell having a first substrate 1 and a second substrate 8 facing one another, a first electrode 2 formed so as to cover the entire surface of the first substrate 1 facing the second substrate 8, a second electrode 4 formed so as to cover the entire surface of the second substrate 8 facing the first substrate 1, and partition wall 6A and partition wall 6B provided so as to seal the periphery of the cell having the first substrate 1 and second substrate 8, wherein an electrophoretic colored particle dispersion liquid containing electrophoretic colored particles 10 and a dispersion medium are included in a space (a space corresponding to a light modulating layer) sealed with the first substrate 1, second substrate 8, partition wall 6A and partition wall 6B. A film reflection member 12B interposed between the partition wall 6A and partition wall 6B at the periphery is provided so as to divide the display medium in two portions in the thickness direction of the display medium. Pores with a size through which the electrophoretic colored particles 10 are able to pass are formed in the film reflection member 12B.

While only one unit cell of the display medium is shown in FIGS. 2A to 2C, plural cells may be continuously disposed in the plain direction of the substrate in one dimension or two dimensions with partition walls between adjoining cells.

The display medium shown in FIGS. 2A to 2C can be manufactured as follows. First, the first electrode 2 is formed on the entire surface at one side of the first substrate 1 and the second electrode 4 is formed on the entire surface at one side of the second substrate 8.

Partition wall 6A and partition wall 6B are formed on the film reflection member 12B. A film obtained by forming pores with a size through which the electrophoretic colored particles 10 are able to pass by laser processing to a resin film may be used as the film reflection member 12B. A frame formed by removing the central portion of a resin film may be bonded to both surfaces of the film reflection member 12B to form the partition wall 6A and partition wall 6B.

Subsequently, the film reflection member 12B having the partition wall 6A and partition wall 6B formed on both surfaces is interposed between the first substrate 1 and second substrate 8 such that the electrode sides of the substrates face one another, and fixed with an adhesive, and the electrophoretic colored particle dispersion liquid are injected into the light modulating layer by the same process as shown in the manufacture of the display medium shown in FIGS. 1A to 1C, and the display medium can be finally obtained by sealing the injection port.

The action of the display medium of the invention shown in FIGS. 2A to 2C will be described below.

In the description of the action, it is assumed that the second substrate 8 and second electrode 4 are transparent to visible light, the electrophoretic colored particles 10 are positively charged red particles, the film reflection member 12B is white, and the color displayed by the display medium is observed from the side where the second substrate 8 of the display medium is provided.

When no voltage is applied, a red color is observed since the electrophoretic colored particles 10 are dispersed in the light modulating layer as shown in FIG. 2A. When a positive voltage is applied to the first electrode 2 and a negative voltage is applied to the second electrode 4 as shown in FIG. 2B, the electrophoretic colored particles 10 move to the negative electrode (second electrode 4) side, and the display medium displays a deep red color.

On the other hand, when a negative voltage is applied to the first electrode 2 and a positive voltage is applied to the second electrode 4 as shown in FIG. 2C, the electrophoretic colored particles 10 move to the negative electrode (first electrode 2) side, and the display medium displays a white color (the color of the film reflection member 12B).

EXAMPLES

While the invention is described in more detail with reference to examples, the invention is by no means restricted to these examples.

<Preparation of Electrophoretic Colored Particles A>

Chloroauric acid ($2.0 \times 10^{-5}$ mol) and silicone oil (20 mL; trade name: KF-96, manufactured by Shin-Etsu Chemical Co., Ltd.) are placed in a 100 ml flask, and the mixture is dispersed with stirring using a magnetic stirrer.

Octadecyl trimethoxysilane ($1.7 \times 10^{-2}$ mol) is added to the dispersion, followed by adding 3-aminopropyl triethoxysilane ($9.0 \times 10^{-4}$ mol). Ascorbic acid ($4.0 \times 10^{-4}$ mol) is further added as a reducing agent, and a red dispersion liquid of a gold colloid is obtained by stirring with a magnetic stirrer.

Electrophoretic colored particles A are obtained by decantation of the obtained dispersion liquid using silicone oil (trade name: KF-96, manufactured by Shin-Etsu Chemical Co., Ltd.) five times.

The average particle diameter of the electrophoretic colored particles is 20 nm. The contact angle $\theta p$ between the electrophoretic colored particles and water measured by the above-mentioned method is 108 degrees.

The contact angle between the colored particles and the solution (silicone oil, trade name: KF-96, manufactured by Shin-Etsu Chemical Co., Ltd.) used for dispersing the colored particles is 0 degree.

<Preparation of Electrophoretic Colored Particles B>

Chloroauric acid ($2.0 \times 10^{-5}$ mol) and silicone oil (20 mL; trade name: KF-96, manufactured by Shin-Etsu Chemical Co., Ltd.) are placed in a 100 ml flask, and the mixture is dispersed with stirring using a magnetic stirrer.

Phenethyl trimethoxysilane ($1.7 \times 10^{-2}$ mol) is added to the dispersion, followed by adding 3-aminopropyl triethoxysilane ($9.0 \times 10^{-4}$ mol). Ascorbic acid ($4.0 \times 10^{-4}$ mol) is further added as a reducing agent, and a red dispersion liquid of a gold colloid is obtained by stirring with a magnetic stirrer.

Electrophoretic colored particles B are obtained by decantation of the obtained dispersion liquid using silicone oil (trade name: KF-96, manufactured by Shin-Etsu Chemical Co., Ltd.) five times.

The average particle diameter of the electrophoretic colored particles is 20 nm. The contact angle $\theta p$ between the electrophoretic colored particles and water measured by the above-mentioned method is 89 degrees.

The contact angle between the colored particles and the solution (silicone oil, trade name: KF-96, manufactured by Shin-Etsu Chemical Co., Ltd.) used for dispersing the colored particles is 0 degree.

<Preparation of Electrophoretic Colored Particles C>

A mixture of styrene monomer (90 parts by weight), red pigment (10 parts by weight, C.I. pigment red 57, manufactured by Sanyo Color Works, LTD) and azoisobutylonitrile (1 part by weight) are pulverized with a ball mill for 20 hours using zirconia balls with a diameter of 10 mm to obtain dispersion liquid A-1. The same treatment as in dispersion liquid A-1 is applied to a mixture of calcium carbonate (30 parts by weight) and water (70 parts by weight) to obtain Dispersion liquid A-2.

After mixing dispersion liquid A-2 (18 parts by weight) and 20% saline solution (50 parts by weight) with stirring, dispersion liquid A-1 (30 parts by weight) is added thereto and the mixture is emulsified to obtain emulsified liquid A-3.

Emulsified liquid A-3 obtained is heated at 70° C. in nitrogen stream, and solid particles A-4 are obtained by stirring the emulsified liquid for 20 hours. Hydrochloric acid (35%, 15 parts by weight) is added to the solid particles A-4 and stirred to dissolve calcium carbonate, and the solid particles are repeatedly washed with water and filtered by suction filtration five times to obtain red particles A-5.

Red particles A-5 obtained are mixed with methyl hydrogen silicone oil (trade name: KF-99, manufactured by Shin-Etsu Chemical Co., Ltd.), and hydrophobilized by stirring to obtain electrophoretic colored particles C.

The average particle diameter of the electrophoretic colored particles is 1 µm. The contact angle $\theta p$ between the colored particles and water measured by the above-mentioned method is 117 degrees, and the contact angle between the colored particles and the solution (silicone oil, trade name: KF-96, manufactured by Shin-Etsu Chemical Co., Ltd.) used for dispersion of the colored particles is 0 degree.

<Particulate Reflection Members A>

A mixture containing methyl methacrylate monomer (80 parts by weight), titanium oxide (17 parts by weight; trade name: TIEPAKE CR63, manufactured by ISHIHARA SANGYO KAISHA, LTD.) and hollow particles (3 parts by weight; trade name: SX866(A), manufactured by JSR Corp.) is pulverized in a ball mill for 20 hours using zirconia balls with a diameter of 10 mm to obtain dispersion liquid B-1.

The same treatment as in dispersion liquid B-1 is applied to a mixture of calcium carbonate (40 parts by weight) and water (60 parts by weight) to obtain dispersion liquid B-2.

Dispersion liquid B-2 (8.5 parts by weight) is mixed with 20% saline (50 parts by weight) with stirring to obtain mixed liquid B-3.

Dispersion liquid B-1 (35 parts by weight) is mixed with ethyleneglycol dimethacrylate (1 part by weight) and azoisobutylonitrile (0.35 parts by weight), and mixed liquid B-3 is added to the mixture and is emulsified to obtain emulsified liquid B-4.

Emulsified liquid B-4 obtained is heated at 65° C. in nitrogen stream, and is stirred for 15 hours to obtain solid particles B-5.

35% hydrochloric acid (15 parts by weight) is added to the solid particles B-5 obtained and is stirred to dissolve calcium carbonate, and white particles B-6 are obtained by repeating suction filtration and washing with water five times. White particles B-6 obtained are classified with a sieve to obtain white particles (particulate reflection members A) with an average diameter of 13 μm.

The contact angle θr between the particles and water measured by the above-mentioned method is 60 degrees.

<Particulate Reflection Members B>

Particulate reflection members B are obtained by mixing particulate reflection member A with methyl hydrogen silicone oil (trade name: KF-99, manufactured by Shin-Etsu Chemical Co., Ltd.) and stirred for hydrophobilizing.

The contact angle θr between the surface of the particulate reflection members and water measured by the above-mentioned method is 115 degrees.

<Film Reflection Member C> n-methyl-2-pyrrolidone (50 parts by weight) is mixed with PES resin (40 parts by weight; trade name SUMIKA EXEL PES4800S, manufactured by Sumitomo Chemical Co., Ltd.) and titanium oxide (10 parts by weight; trade name: TIEPAKE CR63, manufactured by ISHIHARA SANGYO KAISHA, LTD.), and the mixture is stirred with a homogenizer (trade name: SILENT CRUSHER M, manufactured by Heidolph).

The solution obtained is applied on a glass substrate at a thickness of 300 μm, and a white PES film with a thickness of 100 μm is obtained by drying the applied film at 150° C. for 2 hours. Fine pores with a diameter of 10 μm and a pore pitch of 50 μm are formed on the PES film using excimer laser to obtain film reflection member C.

The contact angle θr between reflection member C and water measured by the above-mentioned method is 65 degrees.

<Film Reflection Member D>

Film reflection member C is hydrophobilized by immersing the film in methyl hydrogen silicone oil (trade name: KF-99, manufactured by Shin-Etsu Chemical Co., Ltd.) to obtain film reflection member D.

The contact angle θr between reflection member D and water measured by the above-mentioned method is 110 degrees.

Example 1

The display device having the configuration shown in FIGS. 1A to 1C is manufactured by the following procedure.

First, ITO as the first electrode 2 is deposited at a thickness of 50 nm by a sputtering method on one surface of the first substrate 1 made of a glass plate with an area of 50 mm×50 mm and a thickness of 0.7 mm.

Then, after applying an epoxy resin (trade name: SU-8, manufactured by MicroChem Corp.) on the surface of the first electrode 2, a partition wall 6 with a height of 100 μm and a width of 20 μm is formed at the outer periphery of the first substrate 1 by exposure and wet etching. Subsequently, a heat-adhering epoxy adhesive is coated on the partition wall 6, and particulate reflection members A are injected into the portion surrounded by the partition wall 6 on the first substrate 1 such that the first electrode 2 formed on the surface of the first substrate 1 is completely covered with the particles, followed by injecting a dispersion liquid in which electrophoretic colored particle dispersion liquid A is dispersed in silicone oil (trade name: KF-96, manufactured by Shin-Etsu Chemical Co., Ltd.) to a height of the partition wall 6. The volume packing fraction of the reflection members in the light modulating layer is 52% which is determined from the volume of the light modulating layer calculated from the height of the partition wall 6 and the area of the surface portion of the substrate partitioned by the partition wall 6, and the volume of the dispersion liquid filled in the space within the partition wall 6.

Finally, the second substrate 8 (a glass substrate with an area of 50 mm×50 mm and a thickness of 0.7 mm), on which ITO with a thickness of 50 nm as the second electrode 4 is formed by sputtering, is disposed on the partition wall 6 such that the side on which the second electrode 4 is formed serves as a bonding surface, and both are bonded by heating to manufacture a display medium.

The display medium thus obtained is observed from the side at which the second substrate 8 is provided, and switching of the color display and changes of contrast are confirmed as follows.

A voltage (15 V) is applied to both electrodes such that the first electrode 2 immediately after assembly is a positive electrode. Since the electrophoretic colored particles dispersed in the light modulating layer are positively charged, the particles are observed to move to the negative side electrode by applying the voltage and the display medium displays red color (FIG. 1B). Then, when a voltage (15 V) is applied to both electrodes such that the second electrode 4 is a positive electrode, the electrophoretic colored particles move to the first electrode 2 side and the display medium displays white color (FIG. 1C).

The voltage is applied until the displayed color density is saturated, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 20 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surfaces of the reflection members are observed under a scanning electron microscope (SEM), and adhesion of the electrophoretic colored particles on the surfaces of both electrodes and on the surfaces of the reflection members are observed. The results show that adhesion of the electrophoretic colored particles on the surfaces of both electrodes and on the surfaces of the reflection members is hardly observed.

Example 2

The display medium is manufactured by the same process as in Example 1, except that electrophoretic colored particles (B) are used in place of electrophoretic colored particles (A) used in Example 1.

Then, a voltage (15 V) is applied until display density is saturated by the same method as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 19 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surfaces of the reflection members are observed under a scanning electron microscope (SEM), and adhesion of the electrophoretic colored particles on the surfaces of both electrodes and on the surfaces of the reflection members are observed. The results show that adhesion of the electrophoretic colored particles on the surfaces of both electrodes is hardly observed, although slight adhesion of the electrophoretic colored particles is observed on the surfaces of the reflection members.

Example 3

The display medium is manufactured by the same manufacturing process in Example 1, except that the volume packing fraction of the reflection members in the light modulating layer in Example 1 is changed to 28%.

Then, a voltage (15 V) is applied until display density is saturated by the same method as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 16 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surfaces of the reflection members are observed under a scanning electron microscope (SEM), and adhesion of the electrophoretic colored particles on the surfaces of both electrodes and on the surfaces of the reflection members are observed. The results show that adhesion of the electrophoretic colored particles on the surfaces of both electrodes and on the surfaces of the reflection members is hardly observed.

Example 4

The display medium is manufactured by the same manufacturing process as in Example 1, except that electrophoretic colored particles C are used in place of electrophoretic colored particles A used in Example 1.

Then, a voltage (15 V) is applied until display density is saturated by the same method as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 24 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surfaces of the reflection members are observed under a scanning electron microscope (SEM), and adhesion of the electrophoretic colored particles on the surfaces of both electrodes and on the surfaces of the reflection members are observed. The results show that adhesion of the electrophoretic colored particles on the surfaces of both electrodes and on the surfaces of the reflection members is hardly observed.

Example 5

The display medium having the configuration shown in FIGS. 2A to 2C is manufactured by the following procedure.

Ito as the first electrode 2 is deposited by sputtering at a thickness of 50 nm on one surface of the first substrate 1 made of glass with an area of 50 mm×50 mm and a thickness of 0.7 mm.

After coating a light-sensitive epoxy resin (trade name: SU-8, manufactured by MicroChem Corp.) on the surface of the first electrode 2, the coated resin is exposed and wet-etched to form partition wall 6A with a height of 50 μm and a width of 20 μm along the outer periphery of the first substrate 1. The second substrate 8, second electrode 4 and partition wall 6B are formed by the same steps.

An epoxy adhesive is coated on partition wall 6A of the first substrate 1 and on partition wall 6B of the second substrate 8, and film partition member C is bonded so as to be inserted between the partition walls. Electrophoretic colored particle dispersion liquid A is injected into the light modulating layer through an injection port provided in advance, and the display medium is manufactured by sealing the injection port.

Then, a voltage (15 V) is applied until the displayed color density is saturated in the same manner as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 20 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surface of the reflection member are observed under a scanning electron microscope (SEM), and adhesion of the electrophoretic colored particles on the surfaces of both electrodes and on the surface of the reflection member are observed. The results show that adhesion of the electrophoretic colored particles on the surfaces of both electrodes and on the surface of the reflection member is hardly observed.

Comparative Example 1

The display medium is manufactured by the same manufacturing process as in Example 1, except that particulate reflection members B is used in place of particulate reflection members A used in Example 1.

Then, a voltage (15 V) is applied until the displayed color density is saturated in the same manner as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 20 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surfaces of the reflection members are observed under a scanning electron microscope (SEM), and adhesion of the electrophoretic colored particles on the surfaces of both electrodes and on the surfaces of the reflection members are observed. While the results show that adhesion of the electrophoretic colored particles on the surfaces of both electrodes is hardly observed, it is confirmed that the electrophoretic colored particles are evidently adhered on the surfaces of the reflection members.

Comparative Example 2

The display medium is manufactured by the same manufacturing process as in Example 1, except that particulate reflection members B is used in place of particulate reflection members A used in Example 3.

Then, a voltage (15 V) is applied until the displayed color density is saturated in the same manner as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 16 seconds.

Subsequently, display is repeated for 1 week while polarity of the voltage applied to the electrodes is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surfaces of the reflection members are observed under a scanning electron microscope (SEM), and adhesion of the electrophoretic colored particles on the surfaces of both electrodes and on the surfaces of the reflection members are observed. Although adhesion of the electrophoretic colored particles on both surfaces of the electrodes is hardly observed, it is confirmed that the electrophoretic colored particles evidently adhered on the surfaces of the reflection members.

Comparative Example 3

The display medium is manufactured by the same manufacturing process as in Example 5, except that film reflection member D is used in place of film reflection member C used in Example 5.

Then, a voltage (15 V) is applied until the displayed color density is saturated in the same manner as in Example 1, and reflectivity of the display medium at red display and reflectivity of the display at white display in a state that the display density is saturated are measured with a reflectometer (trade name: X-RITE 404, manufactured by X-Rite) to determine initial contrast (A). The time necessary from application of the voltage to saturation of the display density is 20 seconds.

Subsequently, display is repeated for 1 week while polarity of the voltage applied to the electrode is switched every 30 seconds.

Reflectivity of the display medium at red display and reflectivity of the display at white display in a state that the display density is saturated are measured with a reflectometer (trade name: X-RITE 404, manufactured by X-Rite) after 1 week's repeated display to determine contrast (B) after 1 week's operation.

The display medium after 1 week's repeated display is disassembled, the surfaces of both electrodes and the surface of the reflection member are observed under a scanning electron microscope (SEM), and adhesion of the electrophoretic colored particles on the surfaces of both electrodes and on the surface of the reflection member are observed. Although adhesion of the electrophoretic colored particles on both surfaces of the electrodes is hardly observed, it is confirmed that the electrophoretic colored particles evidently adhered on the surface of the reflection member.

-Evaluation-

Initial contrast (A), contrast (B) after 1 week's operation, and reduction rate (B/A) of contrast (B) after 1 week's operation relative to initial contrast (A) as well as whiteness in each example and comparative example are shown in Table 1.

TABLE 1

| | Display Medium Configuration | Electrophoretic Colored Particles | Volume Packing Fraction of Particulate Reflection Members (%) | Displayed Color | Contact Angle (degrees) $\theta r$ | $\theta p$ | $|\theta p - \theta r|$ | Contact Angle between Electrophoretic Colored Particles and Dispersion Medium |
|---|---|---|---|---|---|---|---|---|
| Ex. 1 | FIG. 1 | Metal Colloid Particles | 52 | White-Red | 60 | 108 | 48 | 0 |
| Ex. 2 | FIG. 1 | Metal Colloid Particles | 52 | White-Red | 60 | 89 | 29 | 0 |
| Ex. 3 | FIG. 1 | Metal Colloid Particles | 28 | White-Red | 60 | 108 | 48 | 0 |
| Ex. 4 | FIG. 1 | Pigment Particles | 52 | White-Red | 60 | 117 | 57 | 0 |
| Ex. 5 | FIG. 2 | Metal Colloid Particles | — | White-Red | 65 | 108 | 43 | 0 |
| Comparative Ex. 1 | FIG. 1 | Metal Colloid Particles | 52 | White-Red | 115 | 108 | 7 | 0 |
| Comparative Ex. 2 | FIG. 1 | Metal Colloid Particles | 28 | White-Red | 115 | 108 | 7 | 0 |
| Comparative Ex. 3 | FIG. 2 | Metal Colloid Particles | — | White-Red | 110 | 108 | 2 | 0 |

| | Evaluation | | | | | |
|---|---|---|---|---|---|---|
| | Initial Contrast (A) = (Reflectivity of Red Light/Reflectivity of White Light) | Initial Whiteness (Initial Reflectivity of White Light) | Contrast (B) after 1 week operation = (Reflectivity of Red Light/Reflectivity of White Light) | Whiteness after 1 week (Reflectivity of White Light after 1 week) | Reduction Rate of Contrast (B/A) | |
| Ex. 1 | 3.9 | 0.16 | 3.5 | 0.17 | 0.90 | AA |
| Ex. 2 | 3.9 | 0.16 | 2.8 | 0.2 | 0.72 | BB |
| Ex. 3 | 3.1 | 0.2 | 2.7 | 0.22 | 0.87 | AA |
| Ex. 4 | 3.7 | 0.16 | 3.4 | 0.17 | 0.92 | AA |
| Ex. 5 | 2.8 | 0.22 | 2.2 | 0.26 | 0.79 | BB |
| Comparative Ex. 1 | 3.9 | 0.16 | 1.7 | 0.3 | 0.44 | CC |
| Comparative Ex. 2 | 3.1 | 0.2 | 1.4 | 0.38 | 0.45 | CC |
| Comparative Ex. 3 | 2.8 | 0.22 | 1.3 | 0.4 | 0.46 | CC |

The evaluation criteria of the reduction rate of contrast in the table 1 are as follows.

AA: B/A is 0.8 or more.

BB: B/A is 0.6 or more but less than 0.8.

CC: B/A is less than 0.6.

What is claimed is:

1. A display medium comprising:
a pair of substrates facing one another, at least one of the substrates being transparent;
electrodes provided at opposing surfaces of the pair of substrates; and
a light modulating layer disposed between the pair of substrates,
the light modulating layer containing electrophoretic colored particles, a dispersion medium for dispersing the electrophoretic colored particles, and a reflection member having light reflection characteristics different from those of the electrophoretic colored particles, and the surface of the electrophoretic colored particles and the surface of the reflection member satisfying the following formula (1):

$$180 > |\theta p - \theta r| \geq 20 \quad \text{formula (1)}$$

in formula (1), θp representing a contact angle (degrees) between the surface of the electrophoretic colored particles and water, and θr representing a contact angle (degrees) between the surface of the reflection member and water.

2. The display medium of claim 1, wherein the contact angle θp between the surface of the electrophoretic colored particles and water is larger than the contact angle θr between the surface of the reflection member and water.

3. The display medium of claim 1, wherein the contact angle between the surface of the electrophoretic colored particles and the dispersion medium is in a range of from about 0 to about 20 degrees.

4. The display medium of claim 1, wherein the reflection member is particulate.

5. The display medium of claim 4, wherein the average particle diameter of the particulate reflection member is larger than the average particle diameter of the electrophoretic colored particles.

6. The display medium of claim 4, wherein the volume packing fraction of the particulate reflection member in the light modulating layer is in a range of from about 20% by volume to about 70% by volume.

7. The display medium of claim 1, wherein the electrophoretic colored particles are metal colloid particles that have a color strength due to surface plasmon resonance.

8. The display medium of claim 1, wherein the reflection member is white-colored.

9. A display device comprising:
- a pair of substrates facing one another, at least one of the substrates being transparent;
- electrodes provided at opposing surfaces of the pair of substrates;
- a light modulating layer disposed between the pair of substrates; and
- an electric field application unit connected to the electrodes,
- the light modulating layer containing electrophoretic colored particles, a dispersion medium for dispersing the electrophoretic colored particles, and a reflection member having light reflection characteristics different from those of the electrophoretic colored particles, and
- the surface of the electrophoretic colored particles and the surface of the reflection member satisfying the following formula (1):

$$180 > |\theta p - \theta r| \geq 20 \qquad \text{formula (1)}$$

in formula (1), θp representing a contact angle (degrees) between the surface of the electrophoretic colored particles and water, and θr representing a contact angle (degrees) between the surface of the reflection member and water.

10. The display device of claim 9, wherein the contact angle θp between the surface of the electrophoretic colored particles and water is larger than the contact angle θr between the surface of the reflection member and water.

11. The display device of claim 9, wherein the contact angle between the surface of the electrophoretic colored particles and the dispersion medium is in a range of from about 0 to about 20 degrees.

12. The display device of claim 9, wherein the reflection member is particulate.

13. The display device of claim 12, wherein the average particle diameter of the particulate reflection member is larger than the average particle diameter of the electrophoretic colored particles.

14. The display device of claim 12, wherein the volume packing fraction of the particulate reflection member in the light modulating layer is in a range of from about 20% by volume to about 70% by volume.

15. The display device of claim 9, wherein the electrophoretic colored particles are metal colloid particles that have a color strength due to surface plasmon resonance.

16. The display device of claim 9, wherein the reflection member is white-colored.

17. A display method comprising:
- applying an electric field to a light modulating layer containing electrophoretic colored particles, a dispersion medium for dispersing the electrophoretic colored particles, and a reflection member having light reflection characteristics different from those of the electrophoretic colored particles; and
- changing the display by moving the electrophoretic colored particles so as to collide with a surface of the reflection member,
- the surface of the electrophoretic colored particles and the surface of the reflection member satisfying the following formula (1):

$$180 > |\theta p - \theta r| \geq 20 \qquad \text{formula (1)}$$

in formula (1), θp representing a contact angle (degrees) between the surface of the electrophoretic colored particles and water, and θr representing a contact angle (degrees) between the surface of the reflection member and water.

* * * * *